United States Patent
Spencer (10) Patent No.: US 10,925,407 B1
(45) Date of Patent: Feb. 23, 2021

(54) PRAYER PILLOW

(71) Applicant: Harvey Spencer, Raleigh, NC (US)

(72) Inventor: Harvey Spencer, Raleigh, NC (US)

( * ) Notice: Subject to any disclaimer, the term of this patent is extended or adjusted under 35 U.S.C. 154(b) by 0 days.

(21) Appl. No.: 16/572,712

(22) Filed: Sep. 17, 2019

(51) Int. Cl.
| | |
|---|---|
| A47C 16/04 | (2006.01) |
| A47C 3/04 | (2006.01) |
| A47C 7/72 | (2006.01) |
| H02J 7/00 | (2006.01) |
| A47C 7/62 | (2006.01) |

(52) U.S. Cl.
CPC ............ *A47C 16/04* (2013.01); *A47C 3/04* (2013.01); *A47C 7/622* (2018.08); *A47C 7/72* (2013.01); *H02J 7/00* (2013.01); *H02J 7/0045* (2013.01)

(58) Field of Classification Search
CPC ..................................................... A47C 16/04
See application file for complete search history.

(56) References Cited

U.S. PATENT DOCUMENTS

| | | | | |
|---|---|---|---|---|
| 1,712,863 A | * | 5/1929 | Wickstrum | A47C 16/04 297/187 |
| 2,175,011 A | * | 10/1939 | Archer | A47C 16/04 297/187 |
| 2,237,909 A | * | 4/1941 | Lund | A47C 9/027 297/187 |
| 4,394,049 A | | 7/1983 | Ward | |
| 4,998,298 A | * | 3/1991 | Mitchell | A47K 17/028 182/106 |
| 5,882,095 A | | 3/1999 | Green | |
| 6,763,537 B1 | | 7/2004 | Crear | |
| 6,810,541 B1 | | 11/2004 | Woods | |
| D502,835 S | | 3/2005 | Booth | |
| 6,951,035 B2 | | 10/2005 | Kinchen | |
| 7,086,702 B1 | * | 8/2006 | Hurt | A47C 7/503 280/32.5 |
| 7,188,381 B2 | | 3/2007 | Lombert | |
| 7,246,391 B2 | | 7/2007 | Brown | |
| 9,844,271 B2 | * | 12/2017 | Zager | A47C 9/025 |
| 2003/0019007 A1 | | 1/2003 | Spencer | |
| 2005/0120482 A1 | | 6/2005 | Robie | |
| 2005/0189809 A1 | * | 9/2005 | Lombert | A47C 16/04 297/452.26 |

(Continued)

FOREIGN PATENT DOCUMENTS

| | | | | |
|---|---|---|---|---|
| FR | 2502487 A1 | * | 10/1982 | ............... A61F 5/01 |
| WO | 2003045205 | | 6/2003 | |

*Primary Examiner* — Timothy J Brindley
(74) *Attorney, Agent, or Firm* — Kyle A. Fletcher, Esq.

(57) ABSTRACT

The prayer pillow is a cushion. The prayer pillow protects the knees of a kneeling person who is participating in a ritual such as prayer. The prayer pillow comprises a master cushion, a camelback, and a lectern. The camelback and the lectern attach to the master cushion. The master cushion provides a cushioned surface on which the person kneels. The camelback separates the knees of the person during the use of prayer pillow. The lectern is an elevated structure configured to hold reading materials associated with the ritual. The prayer pillow provides a plurality of pockets configured to hold domestic articles of the person. The prayer pillow is configured for use with a personal data device. The prayer pillow recharges the personal data device. The prayer pillow is a stackable structure such that a plurality of instantiations of the prayer pillow can be stacked.

19 Claims, 8 Drawing Sheets

(56) References Cited

U.S. PATENT DOCUMENTS

| | | | | |
|---|---|---|---|---|
| 2007/0262619 A1* | 11/2007 | Blemel | ............... | A47C 16/04 297/5 |
| 2008/0022448 A1* | 1/2008 | Todd | ............... | A47K 3/001 4/559 |
| 2011/0088168 A1* | 4/2011 | Haynesworth | ............... | A47C 7/383 5/652 |
| 2013/0192928 A1* | 8/2013 | Lamos | ............... | A47C 16/04 182/230 |
| 2015/0096474 A1* | 4/2015 | Hill | ............... | A47C 16/04 108/50.11 |
| 2016/0198859 A1* | 7/2016 | Labbett | ............... | A47C 16/04 297/183.1 |
| 2017/0143128 A1* | 5/2017 | Sitek | ............... | A47C 7/748 |
| 2017/0237272 A1* | 8/2017 | Corona | ............... | A47C 7/383 320/107 |
| 2019/0350389 A1* | 11/2019 | Sutton, Jr. | ............... | A47C 16/00 |

* cited by examiner

PRAYER PILLOW

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of domestic articles including household equipment, more specifically, a pillow combined with other articles. (A47G9/1045)

SUMMARY OF INVENTION

The prayer pillow is a cushion. The prayer pillow protects the knees of a kneeling person who is participating in a ritual such as prayer. The prayer pillow comprises a master cushion, a camelback, and a lectern. The camelback and the lectern attach to the master cushion. The master cushion provides a cushioned surface on which the person kneels. The camelback separates the knees of the person during the use of prayer pillow. The lectern is an elevated structure configured to hold reading materials associated with the ritual. The prayer pillow articles of the person. The prayer pillow is configured for use with a personal data device. The prayer pillow recharges the personal data device. The prayer pillow is a stackable structure such that a plurality of instantiations of the prayer pillow can be stacked.

These together with additional objects, features and advantages of the prayer pillow will be readily apparent to those of ordinary skill in the art upon reading the following detailed description of the presently preferred, but nonetheless illustrative, embodiments when taken in conjunction with the accompanying drawings.

In this respect, before explaining the current embodiments of the prayer pillow in detail, it is to be understood that the prayer pillow is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the prayer pillow.

It is therefore important that the claims be regarded as including such equivalent construction insofar as they do not depart from the spirit and scope of the prayer pillow. It is employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
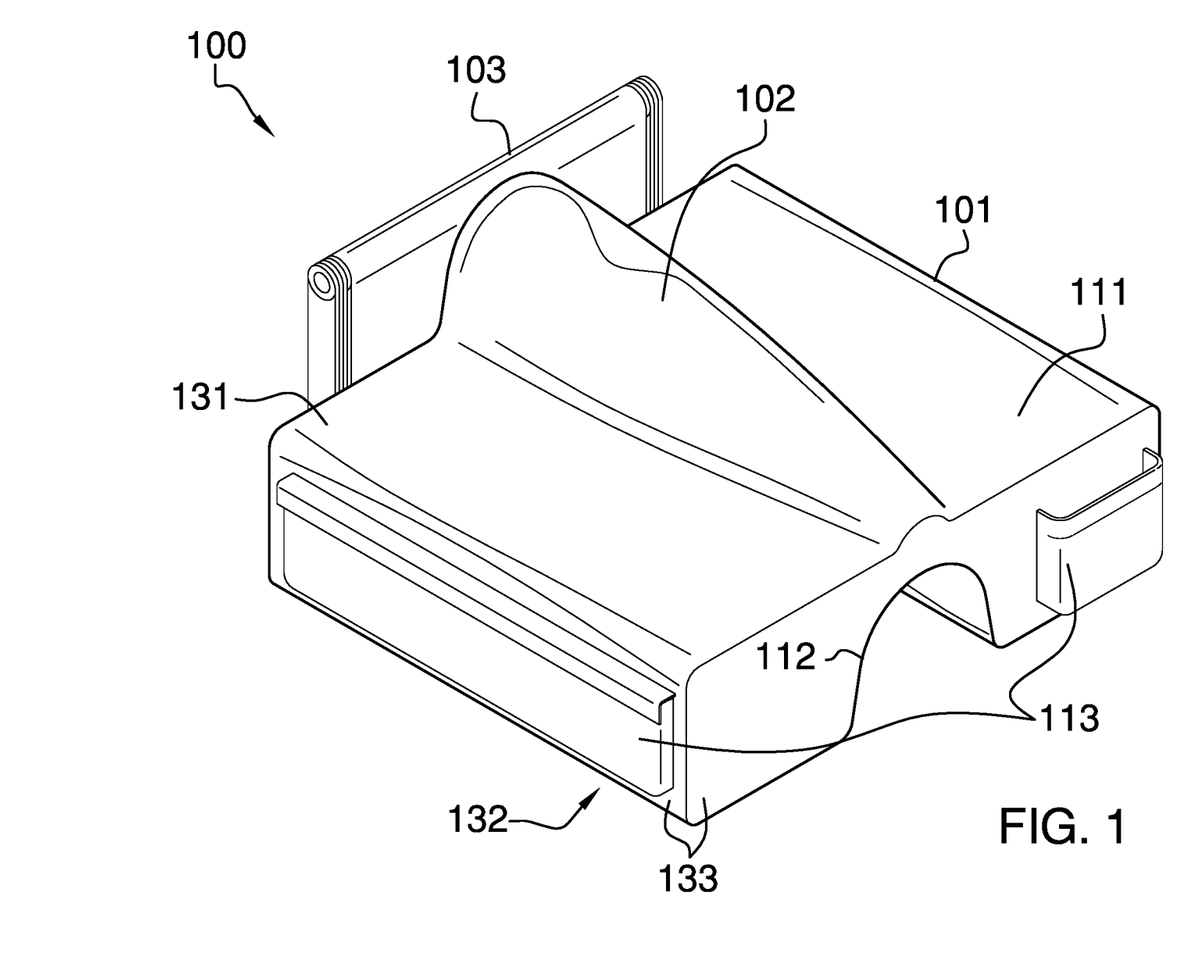
FIG. 1 is a perspective view of an embodiment of the disclosure.
Figure 2:
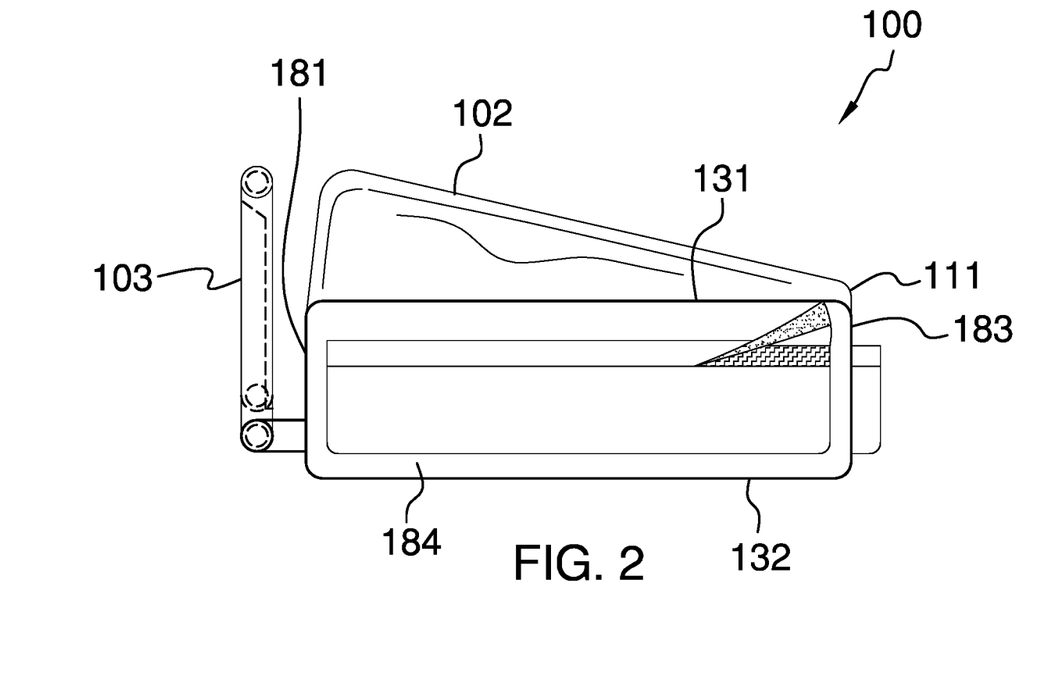
FIG. 2 is a side view of an embodiment of the disclosure.
Figure 3:
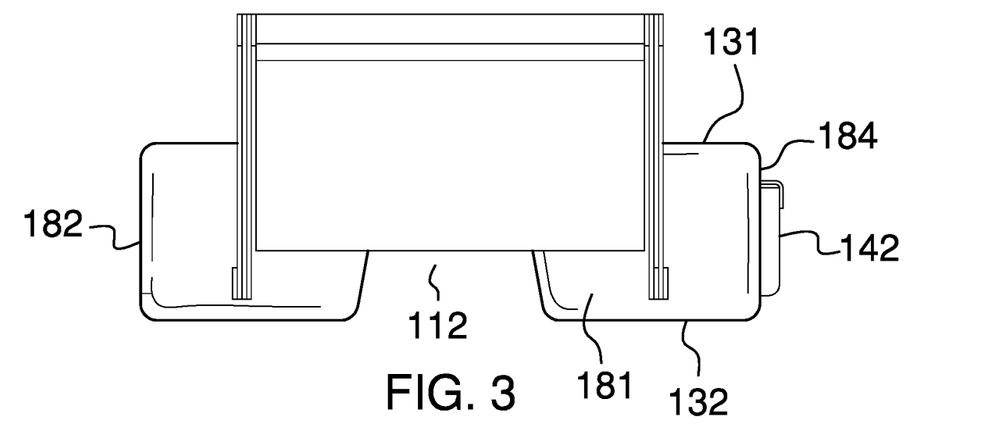
FIG. 3 is a front view of an embodiment of the disclosure.
Figure 4:
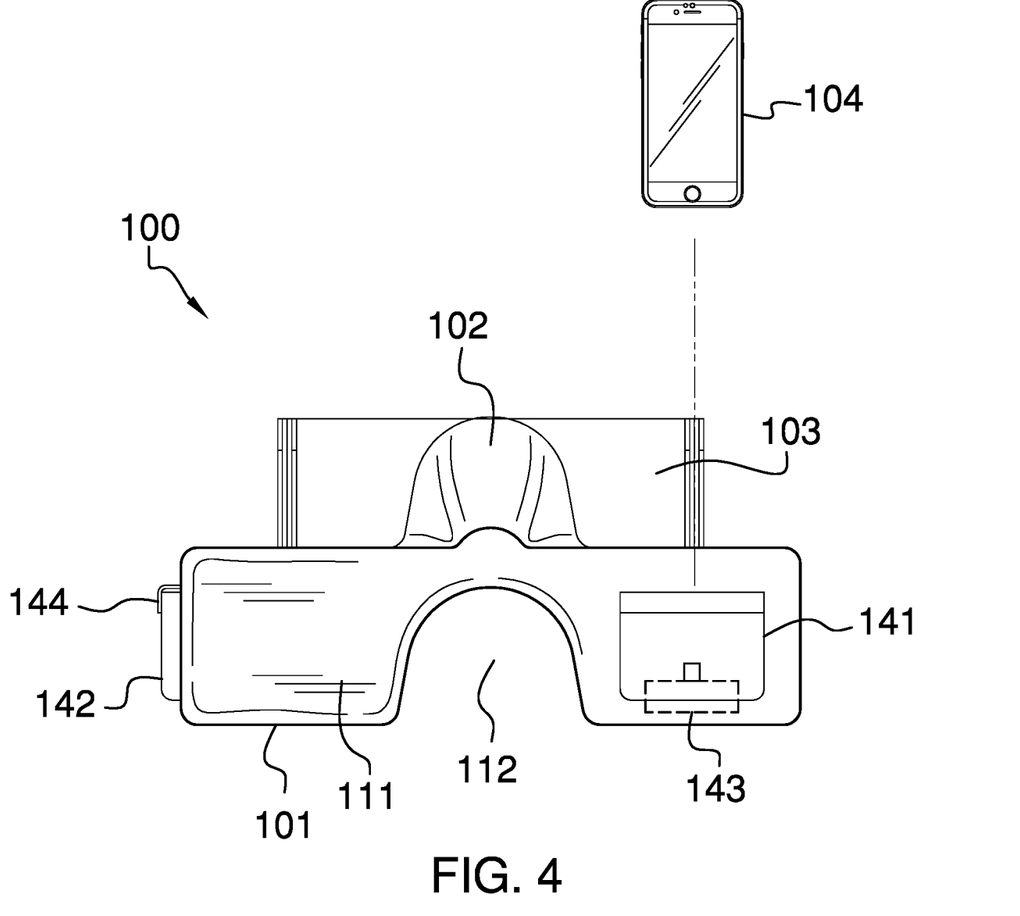
FIG. 4 is a rear view of an embodiment of the disclosure.
Figure 5:
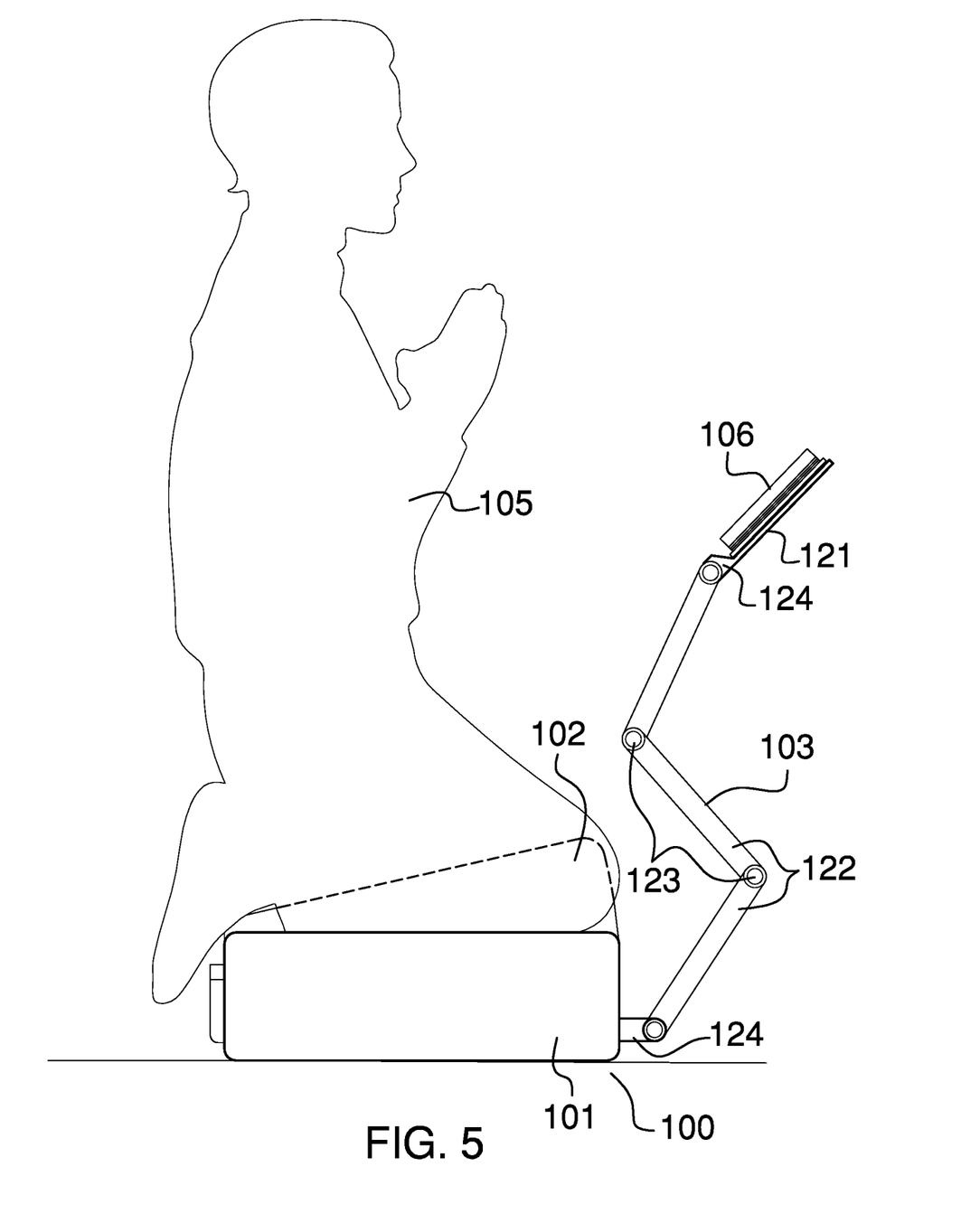
FIG. 5 is an in-use view of an embodiment of the disclosure.
Figure 6:
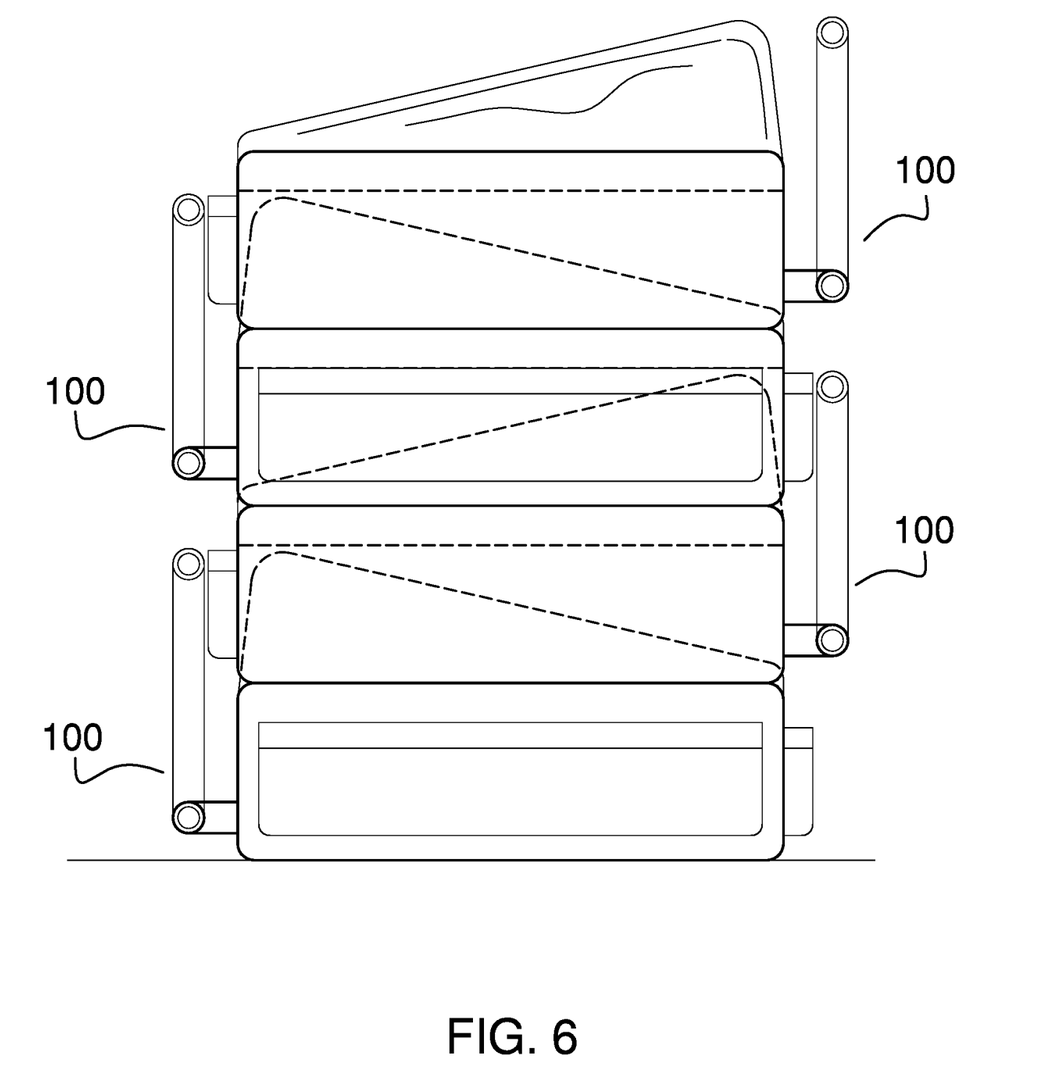
FIG. 6 is a side view of a plurality of instantiations of an embodiment of the disclosure.
Figure 7:
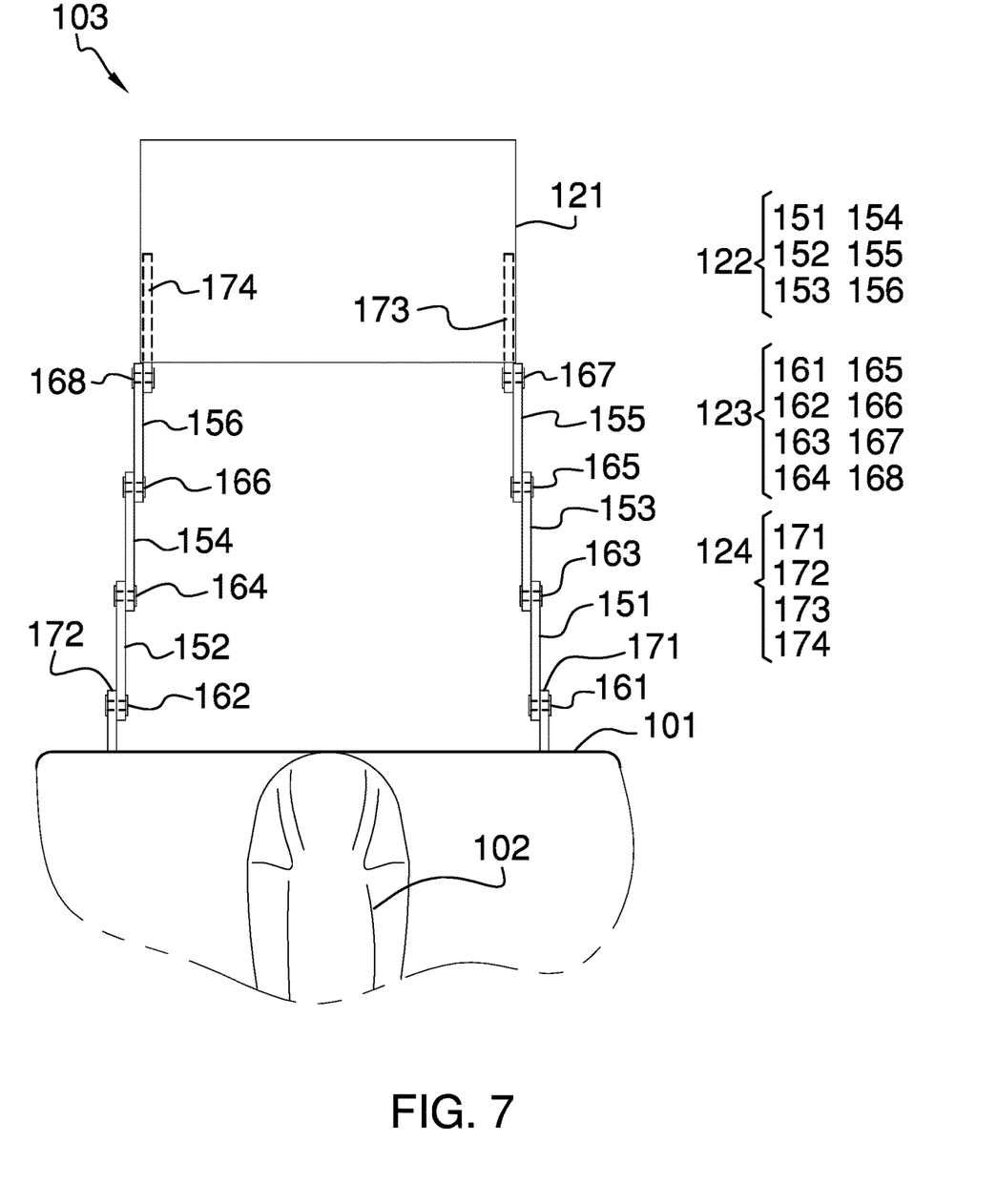
FIG. 7 is a detail view of an embodiment of the disclosure.
Figure 8:
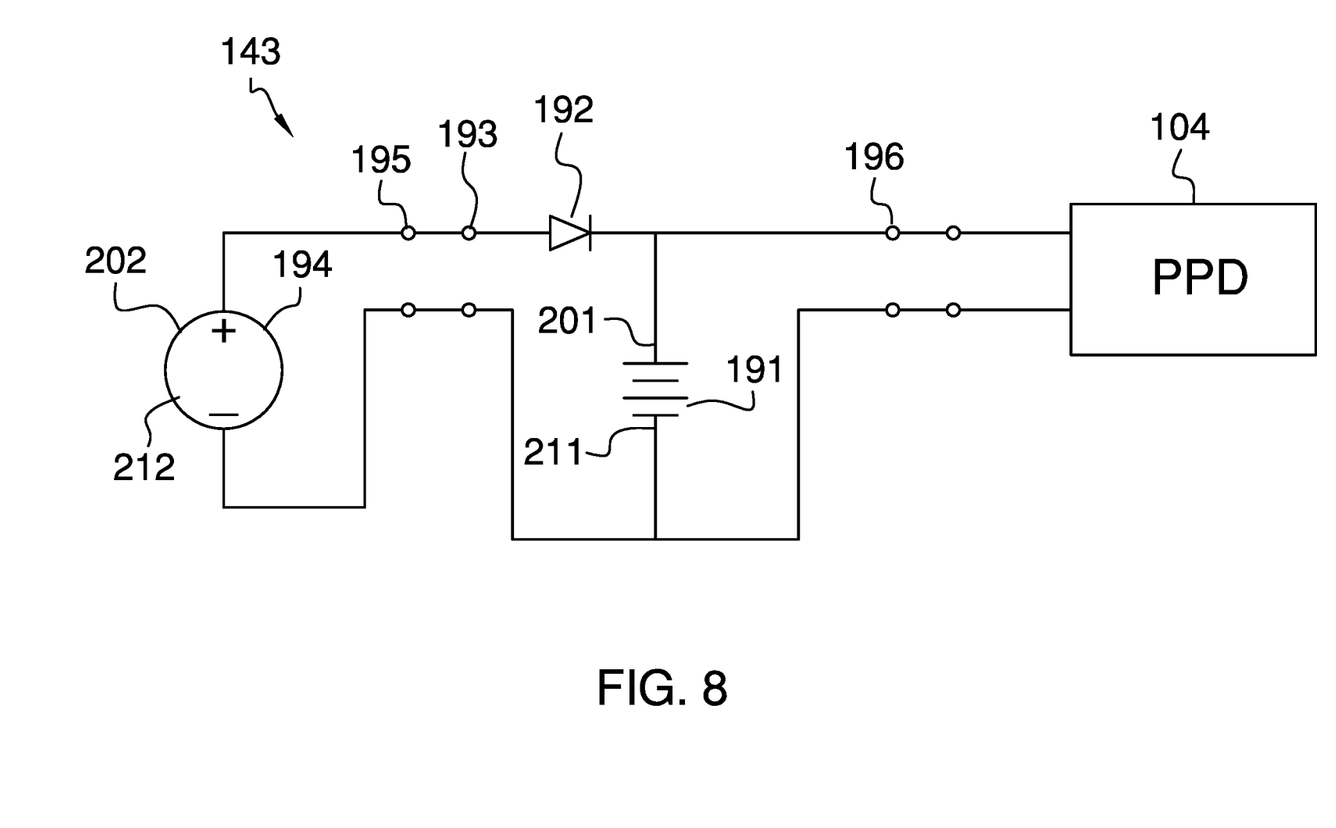
FIG. 8 is a schematic view of an embodiment of the disclosure.

Detailed reference will now be made to one or more potential embodiments of the disclosure, which are illustrated in FIGS. 1 through 8.

The prayer pillow 100 (hereinafter invention) is a cushion. The invention 100 protects the knees of a kneeling person 105 who is participating in a ritual such as prayer. The invention lectern 103. The camelback 102 and the lectern 103 attach to the master cushion 101. The master cushion 101 provides a cushioned surface on which the person 105 kneels. The camelback 102 separates the knees of the person 105 during the use of invention 100. The lectern 103 is an elevated structure configured to hold reading material 106 associated with the ritual. The invention 100 provides a plurality of pockets 113 configured to hold domestic articles of the person. The invention 100 is configured for use with a personal data device 104. The invention 100 recharges the personal data device 104. The invention 100 is a stackable structure such that a plurality of instantiations of the invention 100 can be stacked.

The personal data device 104 is a programmable electrical device that provides data management and communication services through one or more functions referred to as an application. The application is a set of logical operating instructions that are performed by the personal data device 104. The addition of an application will provide increased functionality for the personal data device 104. Methods to design and implement an application on a personal data device 104 are well known and documented in the electrical arts.

The master cushion 101 is a disk-shaped structure. The master cushion 101 is a semi-rigid structure with an elastomeric protect the knees of the person 105. The person 105 kneels on the master cushion 101 during the ritual activity. In the first potential embodiment of the disclosure, the primary shape of the master cushion 101 is a rounded rectangular disk structure. The master cushion 101 is formed from a polyurethane foam. The master cushion 101 comprises a foam block 111, a stacking slot 112, and a plurality of pockets 113.

The foam block 111 is a disk-shaped structure. The foam block 111 is a semi-rigid structure with an elastic nature. The foam block 111 is formed from a polyurethane foam. The foam block 111 forms the pad of the cushion on which the person 105 kneels during the ritual. The foam block 111 forms the primary shape of the master cushion 101. The foam block 111 comprises a superior face 131, an inferior face 132, and a plurality of lateral faces 133.

The superior face 131 is a first congruent end of the disk structure of the foam block 111. The superior face 131 is a horizontally oriented face of the foam block 111 that is distal from the inferior face 132. The inferior face 132 is a second congruent end of the disk structure of the foam block 111. The inferior face 132 is a horizontally oriented face of the foam block 111 that is in contact with a supporting surface during use of the invention 100.

Each of the plurality of lateral faces 133 is a vertically oriented lateral face of the disk structure of the foam block 111. Each of the plurality of lateral faces 133 attaches the superior face 131 to the inferior face 132. The plurality of lateral faces 133 further comprises a first lateral face 181, a second lateral face 182, a third lateral face 183 and a fourth lateral face 184.

The first lateral face 181 is a lateral face selected from the plurality of lateral faces 133. The position of the first lateral face 181 is between the fourth lateral face 184 and the second lateral face 182 and is distal from the third lateral face 183. The second lateral face 182 is a lateral face selected from the plurality of lateral faces 133. The position of the second lateral face 182 is between the first lateral face 181 and the third lateral face 183 and is distal from the fourth lateral face 184. The third lateral face 183 is a lateral face selected from the plurality of lateral faces 133. The position of the third lateral face 183 is between the second lateral face 182 and the fourth lateral face 184 and is distal from the first lateral face 181. The fourth lateral face 184 is a lateral face selected from the plurality of lateral faces 133. The position of the fourth lateral face 184 is between the third lateral face 183 and the first lateral face 181 and is distal from the second lateral face 182.

The stacking slot 112 is a negative space that is formed in the inferior face 132 of the foam block 111. The stacking slot 112 is formed as a pyramidal segment that is geometrically similar to the camelback 102. The inner diameter of the pyramidal segment that forms the stacking slot 112 of a first instantiation of the invention 100 is greater than the outer diameter of the camelback 102 of a second instantiation of the invention 100 such that the stacking slot 112 of the first instantiation slips over the camelback 102 of the second instantiation when the first instantiation of the invention 100 stacks on the second instantiation of the invention 100.

The position of the stacking slot 112 on the inferior face 132 of the foam block 111 is such that: a) the center axis of the stacking slot 112 is parallel to the camelback 102 on the superior face 131 of the foam block 111; while simultaneously, b) the plane defined by the center axes of the stacking slot 112 and the camelback 102 perpendicularly intersect with both the superior face 131 and the inferior face 132 of the foam block 111.

Each of the plurality of pockets 113 is a storage structure used to contain one or more domestic articles associated with the person 105. Each of the plurality of pockets 113 attaches 133 of the foam block 111. The plurality of pockets 113 comprises a charging pocket 141 and a utility pocket 142.

The utility pocket 142 is a pocket that is formed on the fourth lateral face 184 of the foam block 111. The utility pocket 142 is sized to receive and store domestic articles of the person 105 using the invention 100. The utility pocket 142 further comprises a hook and loop fastener 144. The hook and loop fastener 144 is a fastening structure used to securely close the utility pocket 142. The hook and loop fastener 144 is defined elsewhere in this disclosure.

The charging pocket 141 is a pocket that is formed on the third lateral face 183 of the foam block 111. The charging pocket 141 is sized to receive and store the personal data device 104 of the person 105. The charging pocket 141 is configured for use in recharging the personal data device 104. The charging pocket 141 further comprises a charging circuit 143.

The charging circuit 143 is an electrical circuit. The charging circuit 143 is an electrochemical device. The charging circuit 143 converts chemical potential energy into the electrical energy required to recharge the personal data device 104. The charging circuit 143 is an independently powered electric circuit. By independently powered is meant that the without an electrical connection to an external power source 194.

The charging circuit 143 further comprises a battery 191, a diode 192, a charging port 193, the external power source 194, and a second charging plug 196. The external power source 194 further comprises a first charging plug 195. The battery 191, the diode 192, the charging port 193, the external power source 194, the second charging plug 196 and the first charging plug 195 are electrically interconnected. The battery 191 is further defined with a first positive terminal 201 and a first negative terminal 211. The external power source 194 is further defined with a second positive terminal 202 and a second negative terminal 212.

The battery 191 is an electrochemical device. The battery 191 converts chemical potential energy into the electrical energy used to power the charging circuit 143.

The battery 191 is a commercially available rechargeable battery 191. The chemical energy stored within the rechargeable battery 191 is renewed and restored through the use of the charging port 193. The charging port 193 is an electrical circuit that reverses the polarity of the rechargeable battery 191 and provides the energy necessary to reverse the chemical processes that the rechargeable battery 191 initially used to generate the electrical energy. This reversal of the chemical process creates a chemical potential energy that will later be used by the rechargeable battery 191 to generate electricity.

The charging port 193 forms an electrical connection to an external power source 194 using a first charging plug 195. The first charging plug 195 forms a detachable electrical connection with the charging port 193. The charging port 193 receives electrical energy from the external power source 194 through the first charging plug 195. The diode 192 is an electrical device that allows current to flow in only one direction. The diode 192 installs between the rechargeable battery 191 and the charging port 193 such that electricity will not flow from the first positive terminal 201 of the rechargeable battery 191 into the second positive terminal 202 of the external power source 194. In the first potential embodiment of the disclosure, the external power source 194, the first charging plug 195, and the charging port 193 are compatible with USB power requirements.

The second charging plug 196 is a plug that electrically connects the battery 191 to the personal data device 104 such that the battery 191 will provide electric power to the personal data device 104.

The camelback 102 is a mechanical structure. The camelback 102 attaches to the superior face 131 of the foam block 111. The camelback 102 is a semi-rigid structure with an elastomeric nature. The camelback 102 has a pyramidal segment shape. The pyramidal segment structure of the camelback 102 is based on a truncated pyramid. In the first potential embodiment of the disclosure, the truncated pyramid is a truncated cone. The pyramidal segment that mounts on the camelback 102 is bifurcated such that the center axis of the pyramidal segment of the camelback 102 lies on the bifurcating plane of the pyramidal segment.

The camelback 102 mounts on the superior face 131 of the foam block 111. The camelback 102 is positioned on the superior face 131 of the foam block 111 such that the knees of the person 105 straddle the camelback 102 during use. In the first potential embodiment of the disclosure, the position of the camelback 102 on the superior face 131 of the foam block 111 is such that the center axis of the pyramidal segment structure of the camelback 102 perpendicularly intersects with the brink formed at the intersection formed by the superior face 131 and both the: a) first lateral face 181; and, b) the third lateral face 183 of the foam block 111.

The camelback 102 is formed from a polyurethane foam. The master cushion 101 and the camelback 102 are formed as a single unit.

The lectern 103 is a mechanical structure. The lectern 103 is configured for use with reading material 106. The lectern 103 attaches to the master cushion 101. The lectern 103 is an extension apparatus. The lectern 103 is a rotating structure. The lectern 103 elevates the reading material 106 above the superior face 131 of the foam block 111 such that the reading material 106 can be read by the person 105 during the ritual proceedings. The lectern 103 comprises a book holder 121, a plurality of arms 122, a plurality of hinges 123, and a plurality of mounts 124.

The book holder 121 is a mechanical structure. The reading material 106 is placed on the book holder 121. The book holder 121 mounts to the end of the extension apparatus formed by the plurality of arms 122 and the plurality of hinges 123.

Each of the plurality of arms 122 is an extension structure. Each of the plurality of arms 122 is an inert structure. Each of the plurality of arms 122 makes a first attachment to an object selected from the group consisting of: a) an arm subsequently selected from the plurality of arms 122; and, b) a mount selected from the plurality of mounts 124. Each of the plurality of arms 122 makes a second attachment to an object selected from the group consisting of: a) an arm subsequently selected from the plurality of arms 122; and, b) a mount selected from the plurality of mounts 124. The plurality of arms 122 comprises a first arm 151, a second arm 152, a third arm 153, a fourth arm 154, a fifth arm 155, and a sixth arm 156.

The first arm 151 is an inert prism-shaped structure that attaches the first mount 171 to the third arm 153. The second arm 152 is an inert prism-shaped structure that attaches the second mount 172 to the fourth arm 154. The third arm 153 is an inert prism-shaped structure that attaches the first arm 151 to the fifth arm 155. The fourth arm 154 is an inert prism-shaped structure that attaches the second arm 152 to the sixth arm 156. The fifth arm 155 is an inert prism-shaped structure that attaches the third arm 153 to the third mount 173. The sixth arm 156 is an inert prism-shaped structure that attaches the fourth arm 154 to the fourth mount 174.

Each of the plurality of mounts 124 is an inert mechanical structure. Each of the plurality of mounts 124 attaches an arm selected from the plurality of arms 122 to a structure selected from the group consisting of: a) the book holder 121; and, b) the first lateral face 181 of the foam block 111. The plurality of mounts 124 further comprises a first mount 171, a second mount 172, a third mount 173 and a fourth mount 174.

The first mount 171 is an inert prism-shaped structure that attaches the first arm 151 to the first lateral face 181 of the foam block 111. The second mount 172 is an inert prism-shaped structure that attaches the second arm 152 to the first lateral face 181 of the foam block 111. The third mount 173 is an inert prism-shaped structure that attaches the book holder 121 to the fifth arm 155. The fourth mount 174 is an inert prism-shaped structure that attaches the book holder 121 to the sixth arm 156.

Each of the plurality of hinges 123 is a locking hinge. Each of the plurality of hinges 123 attaches an arm selected from the plurality of arms 122 to an object selected from the group consisting of: a) an arm subsequently selected from the plurality of arms 122; and b) a mount selected from the plurality of mounts 124. Each of the plurality of hinges 123 attaches the selected arm to the selected object such that the selected arm rotates relative to the selected object. The locking nature of each of the plurality of hinges 123 allows each selected hinge to lock the position of the selected arm relative to the selected object into a fixed position. The plurality of hinges 123 comprises a first hinge 161, a second hinge 162, a third hinge 163, a fourth hinge 164, a fifth hinge 165, a sixth hinge 166, a seventh hinge 167, and an eighth hinge 168.

The first hinge 161 attaches the first arm 151 to the first mount 171 such that the first arm 151 rotates relative to the first mount 171. The third hinge 163 attaches the first arm 151 to the third arm 153 such that the third arm 153 rotates relative to the first arm 151. The fifth hinge 165 attaches the third arm 153 to the fifth arm 155 such that the fifth arm 155 rotates relative to the third arm 153. The seventh hinge 167 attaches the fifth arm 155 to the third mount 173 such that the fifth arm 155 rotates relative to the third mount 173.

The second hinge 162 attaches the second arm 152 to the second mount 172 such that the second arm 152 rotates relative to the second mount 172. The fourth hinge 164 attaches the second arm 152 to the fourth arm 154 such that the fourth arm 154 rotates relative to the second arm 152. The sixth hinge 166 attaches the fourth arm 154 to the sixth arm 156 such that the sixth arm 156 rotates relative to the fourth arm 154. The eighth hinge 168 attaches the sixth arm 156 to the fourth mount 174 such that the sixth arm 156 rotates relative to the fourth mount 174.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Battery: As used in this disclosure, a battery is a chemical device consisting of one or more cells, in which chemical energy is converted into electricity and used as a source of power. Batteries are commonly defined with a positive terminal and a negative terminal.

Bifurcate: As used in this disclosure, to bifurcate means to divide an object or space into two pieces or segments.

Brink: As used in this disclosure, a brink refers to the edge or line formed by the intersection of a first plane or surface and a second plane or surface wherein a cant exists between the first plane or surface and the second plane or surface.

Carbamate: As used in this disclosure, a carbamate is a functional group consisting of an O—(C=O)—N structure. Carbamate is informally referred to as urethane.

Cavity: As used in this disclosure, a cavity is an empty space or negative space that is formed within an object.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Copolymer: As used in this disclosure, a copolymer is a polymer formed from two or more repeating molecules (also referred to as monomers).

Correspond: As used in this disclosure, the term correspond is used as a comparison between two or more objects wherein one or more properties shared by the two or more objects match, agree, or align within acceptable manufacturing tolerances.

Cushion: As used in this disclosure a cushion is a structure formed with a pad that is used to prevent injury or damage to a person or object.

Diode: As used in this disclosure, a diode is a two terminal semiconductor device that allows current flow in only one direction. The two terminals are called the anode and the cathode. Electric current is allowed to pass from the anode to the cathode.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

External Power Source: As used in this disclosure, an external power source is a source of the energy that is externally provided to enable the operation of the present disclosure. Examples of external power sources include, but are not limited to, electrical power sources and compressed air sources.

Extension Apparatus: As used in this disclosure, an extension apparatus is a mechanical structure that is used to extend or bridge the reach between any two objects.

Extension Structure: As used in this disclosure, an extension structure is an inert physical structure that is used to extend or bridge the reach between any two objects.

Foam: As used in this disclosure, foam is a mass of gas filled spaces, commonly referred to as bubbles, which can be formed: 1) on or in a liquid or gel; or, 2) in a solid material.

Form Factor: As used in this disclosure, the term form factor refers to the size and shape of an object.

Furcate: As used in this disclosure, to furcate or furcation refers to the division of an object into a plurality branches, pieces or segments.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Hinge: As used in this disclosure, a hinge is a device that permits the turning, rotating, or pivoting of a first object relative to a second object. A hinge designed to be fixed into a set position after rotation is called a locking hinge.

Hook and Loop Fastener: As used in this disclosure, a hook and loop fastener is a fastener that comprises a hook surface and a loop surface. The hook surface comprises a plurality of minute hooks. The loop surface comprises a surface of uncut pile that acts like a plurality of loops. When the hook surface is applied to the loop surface, the plurality of minute hooks fastens to the plurality of loops securely fastening the hook surface to the loop surface. A note on usage: when fastening two objects the hook surface of a hook and loop fastener will be placed on the first object and the matching loop surface of a hook and loop fastener will be placed on the second object without significant regard to which object of the two objects is the first object and which of the two objects is the second object. When the hook surface of a hook and loop fastener or the loop surface of a hook and loop fastener is attached to an object this will simply be referred to as the "hook/loop surface" with the understanding that when the two objects are fastened together one of the two objects will have a hook surface and the remaining object will have the loop surface.

Inert: As used in this disclosure, inert is an adjective that is applied to an object, system, or chemical reaction. Inert means that the object, system, or chemical reaction is incapable of motion or activity or is otherwise unreactive.

Instantiation: As used in this disclosure, an instantiation refers to a specific physical object or process that is created using a specification.

Lectern: As used in this disclosure, a lectern is a structure that elevates a platform above a supporting surface such that the platform forms a supporting surface for reading materials or notes. Synonyms for lectern include, but are not limited to podium and pulpit.

Monomer: As used in this disclosure, a monomer refers to a molecular structure that bonds to itself in a repeating manner to form a polymer.

N-gon: As used in this disclosure, an N-gon is a regular polygon with N sides wherein N is a positive integer number greater than 2.

Negative Space: As used in this disclosure, negative space is a method of defining an object through the use of open or empty space as the definition of the object itself, or, through the use of open or empty space to describe the boundaries of an object.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Pad: As used in this disclosure, a pad is a mass of soft material used as a filling or for protection against damage or injury. Commonly used padding materials include, but are not limited to, polyurethane foam, silicone, a polyester fill often referred to as fiberfill or polystyrene beads often referred to as stuffing beans or as bean bag chair beans.

PDD: As used in this disclosure, PDD is an acronym for personal data device.

Perimeter: As used in this disclosure, a perimeter is one or more curved or straight lines that bounds an enclosed area on a plane or surface. The perimeter of a circle is commonly referred to as a circumference.

Personal Data Device: As used in this disclosure, a personal data device is a handheld logical device that is used for managing personal information and communication. Examples of personal data device include, but are not limited to, cellular phones, tablets, and smartphones.

Pivot: As used in this disclosure, a pivot is a rod or shaft around which an object rotates or swings.

Plug: As used in this disclosure, a plug is an electrical termination that electrically connects a first electrical circuit to a second electrical circuit or a source of electricity. As used in this disclosure, a plug will have two or three metal pins.

Pocket: As used in this disclosure, a pocket is a small pouch or storage space that is formed on or into an object. Pockets are often formed by joining a second textile or a second sheeting to a first textile or a first sheeting, respectively, by sewing or heat sealing respectively. Methods to form pockets are well-known and documented in the textile and apparel arts.

Polymer: As used in this disclosure, a polymer refers to a molecular chain that comprises multiple repeating units known as monomers. The repeating unit may be an atom or a molecular structure.

Polyurethane: As used in this disclosure, a polyurethane is a copolymer wherein the one or more monomer chains are linked together carbamates.

Port: As used in this disclosure, a port is an electrical termination that is used to connect a first electrical circuit to a second external electrical circuit. In this disclosure, the port is designed to receive a plug.

Primary Shape: As used in this disclosure, the primary shape refers to a description of the overall geometric shape of an object that is assembled from multiple components.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Pyramid: As used in this disclosure, a pyramid is a three-dimensional shape that comprises a base formed in the shape of an N-gon (wherein N is an integer) with N triangular faces that rise from the base to converge at a point above the base. The center axis of a pyramid is the line drawn from the vertex where the N faces meet to the center of the N-gon base. The center axis of a right pyramid is perpendicular to the N-gon base. Pyramids can be further formed with circular or elliptical bases which are commonly referred to as cone or an elliptical pyramid respectively. A pyramid is defined with a base, an apex, and a lateral face. The base is the N-gon shaped base described above. The apex is the vertex that defines the center axis. The lateral face is formed from the N triangular faces described above.

Pyramidal Segment: As used in this disclosure, a pyramidal segment refers to a pyramid that is bifurcated by a single plane that is parallel to or contains the center axis of the prism or cylinder.

Reach: As used in this disclosure, reach refers to a span of distance between any two objects.

Rounded: A used in this disclosure, the term rounded refers to the replacement of an apex, vertex, or edge or brink of a structure with a (generally smooth) curvature wherein the concave portion of the curvature faces the interior or center of the structure.

Semi-Rigid Structure: As used in this disclosure, a semi-rigid structure is a solid structure that is stiff but not wholly inflexible and that will deform under force before breaking. A semi-rigid structure may or may not behave with an elastic nature in that a semi-rigid structure need not return to its relaxed shape.

Stack: As used in this disclosure, a stack refers to a collection of disk-shaped objects that are stored such that the centers of each of the disk-shaped objects are aligned. The term stack typically implies that the aligned centers are vertically oriented.

Truncated: As used in this disclosure, a geometric object is truncated when an apex, vertex, or end is cut off by a line or plane.

Truncated Pyramid: As used in this disclosure, a truncated pyramid is a frustum that remains when the apex of a pyramid is truncated by a plane that is parallel to the base of the pyramid.

USB: As used in this disclosure, USB is an acronym for Universal Serial Bus which is an industry standard that defines the cables, the connectors, the communication protocols and the distribution of power required for interconnections between electronic devices. The USB standard defines several connectors including, but not limited to, USB-A, USB-B, mini-USB, and micro USB connectors. A USB cable refers to a cable that: 1) is terminated with USB connectors; and, 2) that meets the data transmission standards of the USB standard.

With respect to the above description, it is to be realized that the optimum dimensional relationship for the various components of the invention described above and in FIGS. 1 through 8 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A prayer pillow comprising
a master cushion, a camelback, and a lectern;
wherein the camelback and the lectern are integrally formed with the master cushion;
wherein the prayer pillow is configured to protect the knees of a kneeling person who is participating in a ritual such as prayer;
wherein the camelback separates the knees of the person;
wherein the lectern is an elevated structure configured to hold reading material;
wherein the lectern comprises a book holder, a plurality of arms, a plurality of hinges, and a plurality of mounts;
wherein the book holder is a mechanical structure;
wherein the book holder mounts to the end of the extension apparatus formed by the plurality of arms and the plurality of hinges;
wherein each of the plurality of arms makes a first attachment to an object selected from the group consisting of: a) an arm subsequently selected from the plurality of arms; and, b) a mount selected from the plurality of mounts;
wherein each of the plurality of mounts attaches an arm selected from the plurality of arms to a structure selected from the group consisting of: a) the book holder; and, b) the first lateral face of the foam block;
wherein each of the plurality of hinges is a locking hinge;
wherein each of the plurality of hinges attaches an arm selected from the plurality of arms to an object selected from the group consisting of: a) an arm subsequently selected from the plurality of arms; and b) a mount selected from the plurality of mounts;
wherein each of the plurality of hinges attaches the selected arm to the selected object such that the selected arm rotates relative to the selected object;
wherein the locking nature of each of the plurality of hinges allows each selected hinge to lock the position of the selected arm relative to the selected object into a fixed position.

2. The prayer pillow according to claim 1
wherein the prayer pillow is configured for use with a personal data device;
wherein the prayer pillow recharges the personal data device;
wherein the prayer pillow is a stackable structure such that a plurality of instantiations of the prayer pillow can be stacked.

3. The prayer pillow according to claim 2
wherein the master cushion is a semi-rigid structure with an elastomeric nature;
wherein the master cushion is formed from a polyurethane foam.

4. The prayer pillow according to claim 3
wherein the camelback is a mechanical structure;
wherein the camelback attaches to the foam block;
wherein the camelback is a semi-rigid structure with an elastomeric nature;
wherein the camelback has a pyramidal segment shape;
wherein the pyramidal segment structure of the camelback is based on a truncated pyramid;
wherein the pyramidal segment that mounts on the camelback is bifurcated such that the center axis of the pyramidal segment of the camelback lies on the bifurcating plane of the pyramidal segment.

5. The prayer pillow according to claim 4
wherein the lectern is a mechanical structure;
wherein the lectern is configured for use with reading material;
wherein the lectern attaches to the master cushion;
wherein the lectern is an extension apparatus;
wherein the lectern is a rotating structure;
wherein the lectern elevates the reading material above the superior face of the foam block such that the reading material can be read by the person during the ritual proceedings.

6. The prayer pillow according to claim 5
wherein the master cushion comprises a foam block, a stacking slot, and a plurality of pockets;
wherein the stacking slot is a negative space that is formed in the foam block;
wherein each of the plurality of pockets attaches to the foam block.

7. The prayer pillow according to claim 6
wherein the foam block is a disk-shaped structure;
wherein the foam block is a semi-rigid structure with an elastic nature;
wherein the foam block is formed from a polyurethane foam;
wherein the foam block forms the pad of the cushion on which the person kneels during the ritual;
wherein the foam block forms the primary shape of the master cushion.

8. The prayer pillow according to claim 7
wherein the stacking slot is a negative space that is formed in the inferior face of the foam block;
wherein the stacking slot is formed as a pyramidal segment that is geometrically similar to the camelback;
wherein the inner diameter of the pyramidal segment that forms the stacking slot of a first instantiation of the prayer pillow is greater than the outer diameter of the camelback of a second instantiation of the prayer pillow such that the stacking slot of the first instantiation slips over the camelback of the second instantiation when the first instantiation of the prayer pillow stacks on the second instantiation of the prayer pillow;
wherein the position of the stacking slot on the inferior face of the foam block is such that: a) the center axis of the stacking slot is parallel to the camelback on the superior face of the foam block; while simultaneously, b) the plane defined by the center axes of the stacking slot and the camelback perpendicularly intersect with both the superior face and the inferior face of the foam block.

9. The prayer pillow according to claim 8
wherein each of the plurality of pockets is a storage structure used to contain one or more domestic articles associated with the person;
wherein each of the plurality of pockets attaches to a lateral face selected from the plurality of lateral faces of the foam block.

10. The prayer pillow according to claim 9
wherein the foam block comprises a superior face, an inferior face, and a plurality of lateral faces;
wherein the superior face is a first congruent end of the disk structure of the foam block;
wherein the inferior face is a second congruent end of the disk structure of the foam block;
wherein the superior face is a horizontally oriented face of the foam block that is distal from the inferior face;
wherein the inferior face is a horizontally oriented face of the foam block that is in contact with a supporting surface during use of the prayer pillow;
wherein each of the plurality of lateral faces is a vertically oriented lateral face of the disk structure of the foam block;
wherein each of the plurality of lateral faces attaches the superior face to the inferior face.

11. The prayer pillow according to claim 10
wherein the plurality of lateral faces further comprises a first lateral face, a second lateral face, a third lateral face, and a fourth lateral face;
wherein the position of the first lateral face is between the fourth lateral face and the second lateral face and is distal from the third lateral face;
wherein the position of the second lateral face is between the first lateral face and the third lateral face and is distal from the fourth lateral face;
wherein the position of the third lateral face is between the second lateral face and the fourth lateral face and is distal from the first lateral face;
wherein the position of the fourth lateral face is between the third lateral face and the first lateral face and is distal from the second lateral face.

12. The prayer pillow according to claim 11
wherein the plurality of pockets comprises a charging pocket and a utility pocket;
wherein the utility pocket is a pocket that is formed on the fourth lateral face of the foam block;
wherein the utility pocket further comprises a hook and loop fastener;
wherein the charging pocket is a pocket that is formed on the third lateral face of the foam block;
wherein the charging pocket is sized to receive and store a personal data device of the person;
wherein the charging pocket recharges the personal data device;
wherein the charging pocket further comprises a charging circuit;
wherein the charging circuit is an electrical circuit;
wherein the charging circuit converts chemical potential energy into the electrical energy required to recharge the personal data device;
wherein the charging circuit is an independently powered electric circuit;
wherein by independently powered is meant that the charging circuit can recharge the personal data device without an electrical connection to an external power source.

13. The prayer pillow according to claim 12
wherein the charging circuit further comprises a battery, a diode, a charging port, an external power source, and a second charging plug;
wherein the external power source further comprises a first charging plug;
wherein the battery, the diode, the charging port, the external power source, the second charging plug, and the first charging plug are electrically interconnected;
wherein the battery is further defined with a first positive terminal and a first negative terminal;
wherein the external power source is further defined with a second positive terminal and a second negative terminal;
wherein the battery is an electrochemical device;
wherein the battery converts chemical potential energy into the electrical energy;
wherein the battery is a rechargeable battery;
wherein the charging port is an electrical circuit that reverses the polarity of the rechargeable battery;
wherein the charging port forms an electrical connection to an external power source using a first charging plug;
wherein the first charging plug forms a detachable electrical connection with the charging port;
wherein the charging port receives electrical energy from the external power source through the first charging plug;
wherein the diode is an electrical device that allows current to flow in only one direction;
wherein the diode installs between the rechargeable battery and the charging port such that electricity will not flow from the first positive terminal of the rechargeable battery into the second positive terminal of the external power source;
wherein the second charging plug is a plug that electrically connects the battery to the personal data device such that the battery will provide electric power to the personal data device.

14. The prayer pillow according to claim 13
wherein the camelback attaches to the superior face of the foam block;
wherein the camelback is positioned on the superior face of the foam block such that the knees of the person straddle the camelback during use;
wherein the position of the camelback on the superior face of the foam block is such that the center axis of the pyramidal segment structure of the camelback perpendicularly intersects with the brink formed at the intersection formed by the superior face and both the: a) first lateral face; and, b) the third lateral face of the foam block.

15. The prayer pillow according to claim 14
wherein each of the plurality of arms is an extension structure;
wherein each of the plurality of arms is an inert structure;
wherein each of the plurality of arms makes a second attachment to an object selected from the group consisting of: a) an arm subsequently selected from the plurality of arms; and, b) a mount selected from the plurality of mounts;
wherein each of the plurality of mounts is an inert mechanical structure.

16. The prayer pillow according to claim 15
wherein the plurality of arms comprises a first arm, a second arm, a third arm, a fourth arm, a fifth arm, and a sixth arm;
wherein the first arm is an inert prism-shaped structure that attaches the first mount to the third arm;

wherein the second arm is an inert prism-shaped structure that attaches the second mount to the fourth arm;
wherein the third arm is an inert prism-shaped structure that attaches the first arm to the fifth arm;
wherein the fourth arm is an inert prism-shaped structure that attaches the second arm to the sixth arm;
wherein the fifth arm is an inert prism-shaped structure that attaches the third arm to the third mount;
wherein the sixth arm is an inert prism-shaped structure that attaches the fourth arm to the fourth mount.

17. The prayer pillow according to claim 16
wherein the plurality of mounts further comprises a first mount, a second mount, a third mount and a fourth mount;
wherein the first mount is an inert prism-shaped structure that attaches the first arm to the first lateral face of the foam block;
wherein the second mount is an inert prism-shaped structure that attaches the second arm to the first lateral face of the foam block;
wherein the third mount is an inert prism-shaped structure that attaches the book holder to the fifth arm;
wherein the fourth mount is an inert prism-shaped structure that attaches the book holder to the sixth arm.

18. The prayer pillow according to claim 17
wherein the plurality of hinges comprises a first hinge, a second hinge, a third hinge, a fourth hinge, a fifth hinge, a sixth hinge, a seventh hinge, and an eighth hinge;
wherein the first hinge attaches the first arm to the first mount such that the first arm rotates relative to the first mount;
wherein the third hinge attaches the first arm to the third arm such that the third arm rotates relative to the first arm;
wherein the fifth hinge attaches the third arm to the fifth arm such that the fifth arm rotates relative to the third arm;
wherein the seventh hinge attaches the fifth arm to the third mount such that the fifth arm rotates relative to the third mount;
wherein the second hinge attaches the second arm to the second mount such that the second arm rotates relative to the second mount;
wherein the fourth hinge attaches the second arm to the fourth arm such that the fourth arm rotates relative to the second arm;
wherein the sixth hinge attaches the fourth arm to the sixth arm such that the sixth arm rotates relative to the fourth arm;
wherein the eighth hinge attaches the sixth arm to the fourth mount such that the sixth arm rotates relative to the fourth mount.

19. The prayer pillow according to claim 18
wherein the camelback is formed from a polyurethane foam;
wherein the master cushion and the camelback are formed as a single unit;
wherein the primary shape of the master cushion is a rounded rectangular disk structure;
wherein the external power source, the first charging plug, and the charging port are compatible with USB power requirements;
wherein the truncated pyramid is a truncated cone.

* * * * *